Jan. 14, 1941.        F. LUIPERSBEK        2,228,575
NURTURING FLOWERPOT
Filed Feb. 12, 1940
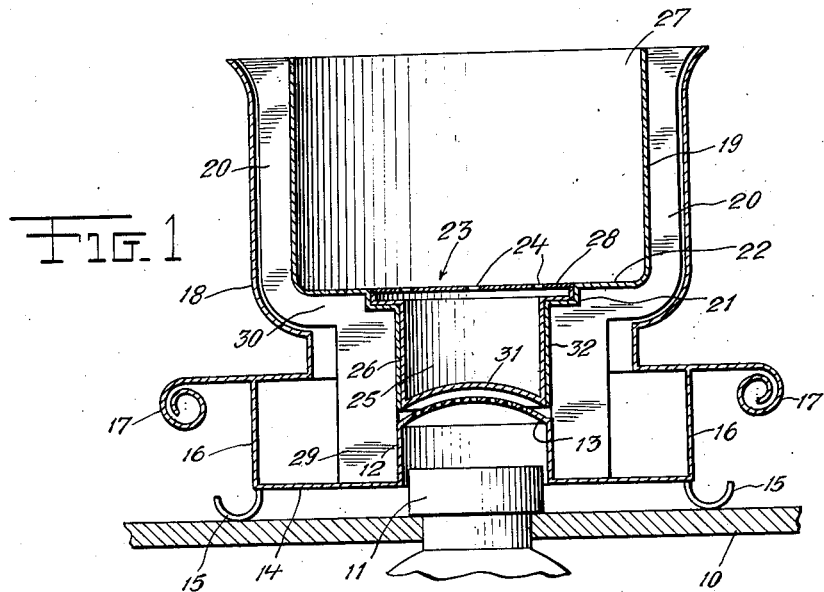
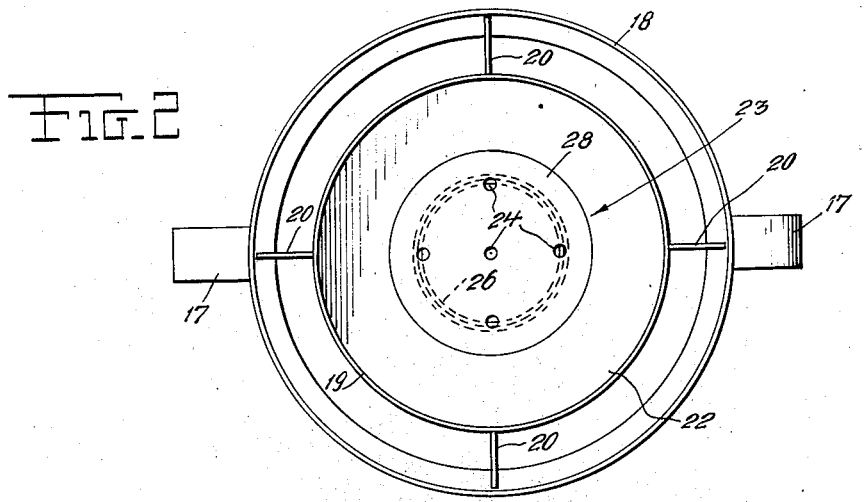
Inventor
F. Luipersbek
By his Attorney J. Ledermann Patented Jan. 14, 1941

2,228,575

UNITED STATES PATENT OFFICE 2,228,575

NURTURING FLOWERPOT

Frank Luipersbek, New York, N. Y.

Application February 12, 1940, Serial No. 318,483

4 Claims. (Cl. 47—34)

The main object of this invention is to provide an ornamental urn suitable for the planting of tropical flowers or ferns therein. The device comprises a chamber for soil which is adapted to be heated by a gas burner and also kept in moisture.

The above and other objects will become apparent in the description below in which characters of reference refer to like-named parts in the accompanying drawing.

Referring briefly to the drawing,

Figure 1 is a longitudinal sectional elevational view through the plant urn.

Figure 2 is a top plan view of the same.

Referring in detail to the drawing, the numeral 10 indicates a panel or table top provided with an opening in which a convenient type of gas burner 11 is received. Over this gas burner an upward bellied bell 12 with a perforated roof 13, is formed in the floor 14, mentioned below. The bell forms part of a frame having the floor 14 thereof mounted upon curved legs 15. The floor continues upwardly as a cylindrical encircling wall 16 from which finger grip arms 17 extend radially. A bowl-like formation 18 surmounts the frame. The bowl 18, consisting of the encircling wall 16 having the floor 14, forms a container in which an urn 19 is housed. To provide rigidity to the urn and to space it from the bowl 18, radial longitudinal ribs 20 are formed exteriorly of the urn, these ribs being bent at a right angle intermediate their length to provide feet 29 resting on the floor 14 and horizontal seats 30 for the urn.

A flange-like recess 21 in the base 22 of the urn removably receives a hollow flanged member 23 whose removable lid or cap 28 is provided with perforations 24. The bottom wall 31 of the body 26 is sealed with a complementary upward belly 31. A tubular projection 32, open at the bottom, extends downward to a point near the belly 13, and the body 26 registers therein. The compartment 25 in the depending body 26 of the member 23, is adapted to be filled with moist dung or fertilizer, not shown. The chamber 27 enclosed by the urn 19, is adapted to be filled with earth, not shown, so that the plant, not shown, growing in the soil, will receive sustenance from the aforesaid fertilizer.

The device is adapted to serve as means for nurturing and maturing horticultural plants, especially those of the tropical variety, where a higher temperature is required than that normally necessary with plants indigenous to the temperate zone. The chamber 27 of the urn is filled with some suitable leaf mold or top soil after the compartment 25 has been filled with a dung or fertilizer rich in nitrates or other necessary chemical compounds. By igniting the gas emanating from the burner 11 and adjusting the same to provide a small flame, the heated exhaust gases and air pass upward between the bowl wall 18 and the urn wall 19. Thus the temperature of the fertilizer and soil is raised, and the heat thus applied directly to the bottom of the chamber 25 aids the soil in drawing nourishment from the fertilizer therein. The roots of the plant set in the soil in the chamber 27, may be drawn through the openings 24 so that they dip into the fertilizer in the compartment 25, if desired. This is particularly adaptable for use by horticultural nurserymen who mature plants to the blossoming stage and then ship these plants to market, as it is possible to raise several crops of these plants a year.

Since the urn 19, member 23, and the ribs 20 may all be lifted intact as a unit and removed from the bowl frame by lifting the urn, and then stood on the feet 29 on a table, a plurality of such units may be provided to be used successively with a single frame, so that while a plant or the soil or fertilizer is being changed, another unit may be in use in the frame, thus avoiding waste of time which is of considerable value in forced breeding.

It is to be noted that certain changes in form and construction may be made without departing from the spirit and scope of the invention.

I claim:

1. A device of the class described comprising a bowl-like frame comprising an upright wall and a horizontal floor, said floor having an upwardly curved perforated belly in the center thereof, said belly being adapted to have a burner mounted thereunder, an urn of lesser diameter than said frame having ribs extending radially from the wall thereof, said urn being mounted within said frame wall with the lower ends of said ribs resting on said floor and the outer edges contacting the inner surface of said frame wall, said urn having a flange-like depression in the floor thereof and a tubular projection extending downward from said depression, said projection being open at the bottom and terminating near and above said belly, a hollow member having an open flange at the top mounted in said depression and having the body thereof registering in said tubular projection, said member having a removable perforated cap, said urn being adapted to have soil placed therein, said hollow member being adapted to have plant nurturing substances placed therein.

2. A device of the class described comprising a bowl-like frame comprising an upright wall and a horizontal floor, said floor having an upwardly curved perforated belly in the center thereof, said belly being adapted to have a burner mounted thereunder, an urn of lesser diameter than said frame having ribs extending radially from the wall thereof, said urn being mounted within said frame wall with the lower ends of said ribs resting on said floor and the outer edges contacting the inner surface of said frame wall, said urn having a flange-like depression in the floor thereof and a tubular projection extending downward from said depression, said projection being open at the bottom and terminating near and above said belly, a hollow member having an open flange at the top mounted in said depression and having the body thereof registering in said tubular projection, said member having a removable perforated cap, said urn being adapted to have soil placed therein, said hollow member being adapted to have plant nurturing substances placed therein, the bottom of said hollow member being upwardly bellied to complement said belly in said floor.

3. A device of the class described comprising a bowl-like frame having an upright wall and a horizontal floor, said floor having an upwardly-curved perforated belly in the center thereof, said belly being adapted to have a burner mounted thereunder, an urn of lesser diameter than said frame having ribs extending radially from the wall thereof, said urn being mounted within said frame with the lower ends of said ribs resting on said floor and the outer edges contacting the inner surface of said frame well, said urn having an opening through the floor thereof above said belly, a hollow perforated member projecting through said opening toward said belly and having a flange on the upper end thereof overlapping the periphery of said opening whereby said member is removably suspended from said flange, said urn being adapted to have soil placed therein, said member being adapted to have nurturing substances placed therein.

4. A device of the class described comprising a bowl-like frame having an upright wall and a horizontal floor, said floor having an upwardly extending perforated belly in the center thereof, said belly being adapted to have a burner mounted thereunder, an urn of lesser diameter than said frame having ribs extending radially therefrom, said ribs being elongated in a vertical direction to extend below said urn, said urn being mounted within said frame with the lower ends of said ribs resting on said floor and the outer edges separating said urn from said frame wall, said urn having an opening through the floor thereof above said belly, a hollow perforated member removably suspended from said opening, said urn being adapted to have soil placed therein, said member being adapted to have nurturing substances placed therein.

FRANK LUIPERSBEK.